United States Patent [19]

Sakagami

[11] Patent Number: 5,288,844
[45] Date of Patent: Feb. 22, 1994

[54] HIGH-REFRACTIVE INDEX PLASTIC OPTICAL MATERIAL

[76] Inventor: Teruo Sakagami, 3-2-7, Nakamukae, Nishiki-machi, Iwaki-shi, Fukushima, Japan

[21] Appl. No.: 907,628

[22] Filed: Jul. 2, 1992

[30] Foreign Application Priority Data

Aug. 1, 1991 [JP] Japan ................ 3-214186

[51] Int. Cl.$^5$ ............................................. C08G 75/04
[52] U.S. Cl. ................................ 528/376; 528/375
[58] Field of Search ........................ 528/376, 375

[56] References Cited

U.S. PATENT DOCUMENTS

4,775,733 10/1988 Kanemura et al. ............... 528/67

FOREIGN PATENT DOCUMENTS

| | | |
|---|---|---|
| 63-130614 | 6/1988 | Japan . |
| 63-130615 | 6/1988 | Japan . |
| 63-150323 | 6/1988 | Japan ............ 528/376 |
| 63-150324 | 6/1988 | Japan ............ 528/376 |
| 64-26622 | 1/1989 | Japan . |
| 1-197528 | 8/1989 | Japan ............ 528/376 |
| 1-330351 | 12/1989 | Japan . |
| 2-270859 | 11/1990 | Japan . |
| 2-283731 | 11/1990 | Japan ............ 528/376 |
| 2-298506 | 12/1990 | Japan . |

Primary Examiner—John C. Bleutge
Assistant Examiner—Helen F. Lee
Attorney, Agent, or Firm—Oliff & Berridge

[57] ABSTRACT

Disclosed herein is a high-refractive index plastic optical material comprising a copolymer obtained by subjecting a mixture composed of a component A consisting of a dithiol compound represented by the formula I:

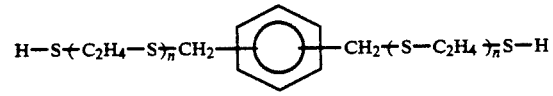

wherein n stands for an integer of 1-3, and a component B consisting of divinylbenzene, said mixture containing both components in such a manner that the proportion of the component A to the component B is 0.25-3.5 in terms of weight ratio, to addition polymerization and having a refractive index of at least 1.63 and an Abbe's number of at least 27. The optical material has excellent optical properties that the refractive index is high and the dispersion is low, and moreover possesses good physical properties.

3 Claims, No Drawings

HIGH-REFRACTIVE INDEX PLASTIC OPTICAL MATERIAL

BACKGROUND OF THE INVENTION

1) Field of the Invention

This invention relates to a high-refractive index plastic optical material, and especially to a high-refractive index plastic optical material low in dispersion.

2) Description of the Related Art

In optical instruments, a variety of inorganic glass lenses have heretofore been used. In recent years, plastic lenses have however begun being used widely together with the inorganic glass lenses owing to their good lightweight property, processability, stability, dyeability, high-volume production capability and reducibility in cost.

Among various properties required for optical lenses, it is extremely important for them to have a high refractive index and be low dispersion. According to a lens composed of an optical material high in refractive index, it is possible to make a lens system, which occupies an important position in optical instruments such as microscopes, cameras and telescopes and spectacle lenses, compact, and hence to reduce its weight and control aberration due to spherical surface and/or the like to a small extent. On the other hand, the low dispersion of the optical material is extremely important in that the chromatic aberration of the lens becomes small.

As with materials for inorganic glass lenses, however, materials for plastic lenses also show a tendency to be high dispersion if they are high in refractive index, but to be low dispersion if they are low in refractive index on the other hand. For example, there is mentioned a diethylene glycol bisallyl carbonate resin designated "CR-39" as a plastic material for spectacle lenses, which is most widely used at present. Although this resin has an Abbe's number as high as 60 (namely, low in dispersion), its refractive index is as extremely low as 1.50 (as measured at 20° C.; the same shall apply to the following). Besides, polymethyl methacrylate which is being used in a partial field as a material for lenses is also high in Abbe's number, but has a refractive index as low as 1.49.

On the other hand, polystyrene, which is credited with being relatively high in refractive index and low in dispersion, has a refractive index of 1.59 and an Abbe's number of 30.4. Similarly, polycarbonate has a refractive index of 1.59 and an Abbe's number of 29.5. However, other physical properties of these synthetic resins are far from satisfactory as materials for lenses. For example, polystyrene is low in surface hardness and moreover lacking in solvent resistance. Besides, polycarbonate is low in surface hardness and moreover lacking in impact resistance. Further, polynaphthyl methacrylate, which has a refractive index of 1.64, and polyvinylnaphthalene, which has a refractive index of 1.68, have an Abbe's number as considerably low as 24 and 20, respectively. Neither of them is hence said to be a good optical material.

As described above, there has heretofore been known no plastic optical material having excellent optical properties that the refractive index is high and the dispersion is low, and moreover possessing good physical properties.

SUMMARY OF THE INVENTION

The present invention has been completed in view of the foregoing circumstances and has as its object the provision of a high-refractive index plastic optical material having excellent optical properties that the refractive index is high and the dispersion is low, and moreover possessing good physical properties.

In an aspect of this invention, there is thus provided a high-refractive index plastic optical material comprising a copolymer obtained by subjecting a mixture composed of a component A consisting of a dithiol compound represented by the following formula I:

wherein n stands for an integer of 1–3, and a component B consisting of divinylbenzene, said mixture containing both components in such a manner that the proportion of the component A to the component B is 0.25–3.5 in terms of weight ratio, to addition polymerization and having a refractive index of at least 1.63 and an Abbe's number of at least 27.

The optical material according to the present invention has optical properties suitable for use in particular as lenses in that the copolymer has a refractive index as high as at least 1.63 and moreover is sufficiently low in dispersion as demonstrated by the fact that its Abbe's number is at least 27, and high in colorless transparency, and is also excellent in physical properties such as solvent resistance, heat resistance and surface hardness. Therefore, the optical material has extremely good performance well balanced among the above-mentioned properties.

DETAILED DESCRIPTION OF THE INVENTION AND PREFERRED EMBODIMENTS

The high-refractive index plastic optical material according to this invention comprises an addition copolymer derived from comonomer components composed of the specific components A and B. The principal component in the copolymer is formed by a dithiol compound as the component A, which is represented by the formula I. The value of n in the formula I has an important connection with the optical properties of the resulting copolymer. Namely, the dithiol compound tends to lower the compatibility with divinylbenzene of the component B as the value of n increases. In particular, any dithiol compounds in which n is 4 or greater are insufficient in compatibility with the component B, resulting in a copolymer low in transparency. In this invention, a dithiol compound in which the value of n is 1–3 is accordingly used as the component A.

The use of dithiol compounds different in substitution sites of each two methylene groups bonded to the aromatic ring in the formula I, which represents the dithiol compound of the component A, results in copolymers somewhat different in optical properties from each other. For example, a copolymer obtained from a dithiol compound in which the substitution sites of the methylene groups are in the para position to each other is somewhat high in refractive index compared with those obtained from dithiol compounds in which the substitution sites are in position other than the para position to each other. On the other hand, a dithiol compound in which the substitution sites of the methylene groups are in the meta or ortho position to each other is high in compatibility with divinylbenzene compared with the dithiol compound in which the substitution sites are in the para position to each other and hence permits the provision of optical materials very high in transparency. Therefore, dithiol compounds different in substitution position to each other can be separately used as a component A as necessary for the intended end application as an optical material.

As specific examples of the dithiol compound represented by the formula I, may be mentioned the following compounds. However, the component A useful in the practice of this is not limited thereto.

(1) 1,4-Bis(2-mercaptoethylenethio)xylylene;
(2) 1,3-Bis(2-mercaptoethylenethio)xylylene;
(3) 1,4-Bis(2-mercaptothioethoxyethylenethio)xylylene;
(4) 1,3-Bis(2-mercaptothioethoxyethylenethio)xylylene;
(5) 1,2-Bis(2-mercaptothioethoxyethylenethio)xylylene;
(6) 1,4-Bis(2-mercaptodithioethoxyethylenethio)xylylene; and
(7) 1,3-Bis(2-mercaptodithioethoxyethylenethio)xylylene.

The respective structures of the dithiol compounds as described above are as follows:

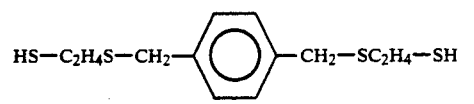
(1)

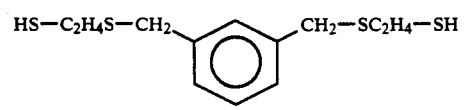
(2)

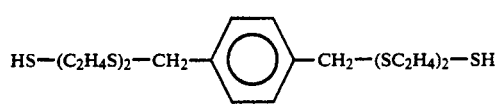
(3)

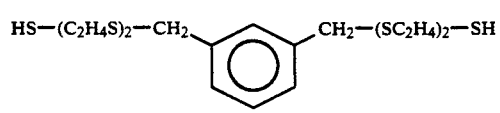
(4)

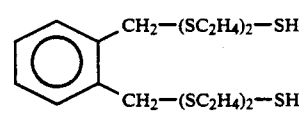
(5)

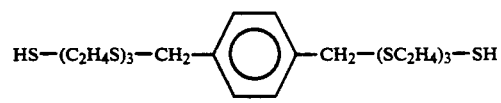
(6)

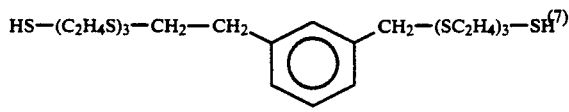
(7)

The component A as described above does not undergo polymerization by itself. In this invention, a copolymer obtained by subjecting divinylbenzene as the component B to addition polymerization with the component A is provided as an optical material. Divinylbenzene is a crosslinkable monomer having two vinyl groups, which are addition-polymerizable or copolymerizable, in its molecule. Divinylbenzene used in this invention is required to have a high purity. Commercially-available divinylbenzene generally contains impurities in a great amount and hence can not undergo addition polymerization smoothly. It is therefore impossible to efficiently obtain a high-molecular weight polymer. Specifically, it is preferred to use divinylbenzene having a purity of at least 70%, particularly at least 75%. If divinylbenzene having a purity lower than 70% is used, the intended polymerization reaction is perturbed, so that the molecular weight of the resulting polymer does not become sufficiently high. Therefore, the polymer can not be obtained as a copolymer high in hardness. It is accordingly difficult to obtain any copolymer having high solvent resistance. Moreover, the copolymer contains low-molecular weight components in a great proportion and hence is low in mechanical strength. There is a potential problem that the copolymer is damaged in secondary processing required for the formation of lenses by way of example, or the like.

In this invention, it is unnecessary that the monomer composition consists only of a pure dithiol compound and pure divinylbenzene as described above. The composition may contain impurities or one or more other comonomers. However, it is not preferred that the total proportion of these impurities or other comonomer to be contained exceeds 30 wt. % of all the comonomers. It is preferred to contain the pure dithiol compound and pure divinylbenzene in a proportion of at least 70 wt. %.

The components A and B are used in such a manner that the weight ratio, $\alpha$ of the component A to the component B (component A/component B) falls within a range of 0.25–3.5. The value of $\alpha$ is preferably 0.4–2.5, and more preferably 0.55–2.0. If the value of $\alpha$ is smaller than 0.25, the proportion of the component A is too low, so that difficulties are encountered in obtaining the intended copolymer high in refractive index and low in dispersion, specifically, a copolymer having properties that the refractive index is at least 1.63 and the Abbe's number is at least 27. If the value of $\alpha$ exceeds 3.5 on the other hand, the proportion of the component B is too low, so that the resulting copolymer becomes low in degrees of addition polymerization and crosslinking. As a result, it is impossible to obtain a copolymer having good physical properties such as high hardness, which are required for optical materials.

The addition polymerization reaction of the component A and the component B proceeds with a radical polymerization initiator known per se in the art. Therefore, the polymerization process, reaction conditions and the like for this addition polymerization may be the same as those of the conventional radical polymerization reaction. However, it is generally preferred to make use of a cast polymerization process, by which the form of an intended optical material can be directly given, because a part of divinylbenzene used as the component B singly polymerizes, and hence to proceed a crosslinking reaction, so that it is substantially impossible to subject the resulting copolymer to a treatment which is accompanied by dissolution or melting.

The cast polymerization process is a well known technique and can be applied to the present invention as it is. A casting mold, frame or the like in the form of a plate, lens, cylinder, square pillar, cone, sphere or the like, which has been designed according to the intended end and application of the resulting copolymer, is used as a vessel for the cast polymerization. The material thereof can be optionally selected from inorganic glasses, plastics, metals, etc. as necessary for the end intended. The polymerization reaction can be practically performed by charging a mixture composed of the component A, component B and polymerization initiator into a vessel for cast polymerization and then heating the mixture. However, it is also possible to conduct the polymerization reaction by reacting the monomer mixture to a certain degree in advance in another reaction vessel and then pouring the resultant prepolymer or syrup into the vessel for the cast polymerization to complete polymerization. The essential monomer components and polymerization initiator may be mixed either all together or by stages. The monomer mixture may contain an antistatic agent, colorant, filler, ultraviolet absorbent, heat stabilizer, antioxidant and other auxiliary materials as necessary for the expected application of the resulting copolymer.

The copolymer of the optical material according to this invention contains a specific dithiol compound as a monomer component and is hence obtained as that high in refractive index and low in dispersion, specifically, that having a refractive index of at least 1.63 and an Abbe's number of at least 27. As described above, the optical material of this invention features that the copolymer comprises the specific monomer components. Accordingly, the means conventionally utilized can be applied to obtain an actual optical material from the copolymer. Namely, it is possible to make good use of a means in which an optical material having a particular form is directly obtained by the cast polymerization process, a means in which an optical material in an intended form is skived from the copolymer in the form of a plate or block, or the like. This optical material can be further subjected to a surface-polishing treatment, an antistatic treatment and other post treatments as needed, whereby an optical material having desired performance can be obtained. Further, in order to raise the surface hardness of the optical material, it is also possible to coat the surface of the optical material with a suitable inorganic material or to apply an organic covering material to the surface by dipping or the like.

Examples of this invention will hereinafter be described. However, it should be borne in mind that this invention is not limited to and by the following examples.

EXAMPLE 1

Forty parts by weight of well purified 1,3-bis(2-mercaptoethylenethio)xylylene having a purity of 98% were mixed with 60 parts by weight of divinylbenzene having a purity of 81%. The resulting mixture was added with 1.2 parts by weight of tert-butyl peroxyneodecanoate to thoroughly mix them. Here, the weight ratio, $\alpha$ of the component A to the component B is 0.81.

This liquid mixture was charged into a glass-made mold for a lens and successively heated at different temperatures, i.e., 50° C. for 10 hours, 60° C. for 8 hours, 80° C. for 3 hours and 100° C. for 2 hours to complete polymerization, thereby producing a colorless, transparent lens of −2.00 diopter.

This lens had a refractive index of 1.632 and an Abbe's number of 28.8 and was hence sufficiently high in refractive index and sufficiently low in dispersion. This lens was absolutely insoluble in acetone and benzene and hence very high in resistance to organic solvents.

Further, the lens had a surface hardness of 3 H in terms of a pencil hardness in accordance with JIS K5400 (the same shall apply to the following) and a penetration temperature (a temperature at which a penetration as measured in accordance with JIS K7206 is 0.4 mm; the same shall apply to the following) of 110° C., said penetration temperature being an index of heat resistance, and was hence excellent in either case. It is apparent from these values that a copolymer of this lens has excellent optical properties and moreover possesses good physical properties in that it is sufficiently high in degree of polymerization and also high in mechanical strength, and is hence extremely well balanced as an optical material.

EXAMPLE 2

Polymerization was conducted in the same manner as in Example 1 except that 50 parts by weight of well purified 1,4-bis(2-mercaptoethylenethio)xylylene having a purity of 98% and 50 parts by weight of divinylbenzene having a purity of 81% were used, thereby producing a colorless, transparent lens of +2.25 diopter. Here, the weight ratio, $\alpha$ of the component A to the component B is 1.21.

This lens had a refractive index of 1.642 and an Abbe's number of 29.5 and was hence sufficiently high in refractive index and sufficiently low in dispersion. Further, this lens was absolutely insoluble in acetone and benzene and had a surface hardness of 3 H and a penetration temperature of 95° C.

COMPARATIVE EXAMPLE 1

Polymerization was conducted in the same manner as in Example 1 except that 15 parts by weight of 1,3-bis(2-mercaptoethylenethio)xylylene having a purity of 98% and 85 parts by weight of divinylbenzene having a purity of 81%, which were the same as those used in Example 1, were used, thereby producing a lens. Here, the weight ratio, $\alpha$ of the component A to the component B is 0.21.

Although this lens had an Abbe's number as high as 28, the refractive index thereof was as low as 1.619. This is attributed to the lowered proportion of the component A.

REFERENTIAL EXAMPLE 1

Polymerization was conducted in the same manner as in Example 1 except that 40 parts by weight of 1,3-bis(2-mercaptoethylenethio)xylylene having a purity of 98% and 60 parts by weight of divinylbenzene having a purity of 55% were used, thereby producing a lens. Here, the weight ratio, $\alpha$ of the component A to the component B is 1.19.

This lens was transparent, but was so soft that it was easily deformed by the force of fingers at room temperature. Its heat resistance was considerably low. The lens was hence unfit for use. Further, the lens was easily soluble in a contact liquid used in the measurement of its refractive index by an Abbe's refractometer. Therefore, it was impossible to practically measure the refractive index. It is understood from this fact that when the purity of divinylbenzene to be used in practice is low, the resulting copolymer is deteriorated in heat resistance and solvent resistance.

COMPARATIVE EXAMPLE 2

Polymerization was conducted in the same manner as in Example 1 except that 78 parts by weight of 1,3-bis(2- mercaptoethylenethio)xylylene having a purity of 98% and 22 parts by weight of divinylbenzene having a purity of 81% were used. However, the resulting molded product was in the form of gel and hence not solidified completely, so that it was absolutely unfit for practical use as a lens. Here, the weight ratio, α of the component A to the component B is 4.29.

It is understood from this example that when the proportion of the dithiol compound is too high, namely, the ratio of the divinylbenzene is lower, no copolymers high in degree of polymerization can be obtained, so that any practical lenses can not be produced.

EXAMPLE 3

Polymerization was conducted in the same manner as in Example 1 except that 35 parts by weight of well purified 1,3-bis(2-mercaptothioethoxyethylenethio)xylylene having a purity of 98% and 65 parts by weight of divinylbenzene having a purity of 81% were thoroughly mixed with each other, thereby producing a colorless, transparent lens of +2.00 diopter. Here, the weight ratio, α of the component A to the component B is 0.65.

This lens had a refractive index of 1.631 and an Abbe's number of 29.1 and was hence sufficiently high in refractive index and sufficiently low in dispersion. Further, this lens was absolutely insoluble in acetone and benzene and had a surface hardness of 3 H and a penetration temperature of 126° C.

EXAMPLE 4

Polymerization was conducted in the same manner as in Example 1 except that 33 parts by weight of well purified 1,3-bis(2-mercaptodithioethoxyethylenethio)xylylene having a purity of 99% and 67 parts by weight of divinylbenzene having a purity of 81% were used, thereby producing a colorless, transparent lens of −4.50 diopter. Here, the weight ratio, α of the component A to the component B is 0.60.

This lens had a refractive index of 1.644 and an Abbe's number of 31.0 and was hence sufficiently high in refractive index and sufficiently low in dispersion. Further, this lens was absolutely insoluble in acetone and benzene and had a surface hardness of 3 H and a penetration temperature of 130° C.

EXAMPLE 5

Polymerization was conducted in the same manner as in Example 1 except that 68 parts by weight of well purified 1,3-bis(2-mercaptoethylenethio)xylylene having a purity of 98% and 32 parts by weight of divinylbenzene having a purity of 81% were used, thereby producing a colorless, transparent lens. Here, the weight ratio, α of the component A to the component B is 2.57.

This lens had a refractive index of 1.631 and an Abbe's number of 34.3 and was hence sufficiently good in balance between the refractive index and the Abbe's number. Further, this lens was absolutely insoluble in acetone and benzene and had a surface hardness of 2 H and a penetration temperature of 70° C.

What is claimed is:

1. A high-refractive index plastic optical material comprising a copolymer obtained by subjecting a mixture composed of a component A consisting of a dithiol compound represented by the following formula I:

wherein n stands for an integer of 2 or 3, and a component B consisting of divinylbenzene, said mixture containing both components in such a manner that the proportion of the component A to the component B is 0.25-3.5 in terms of weight ratio, to addition polymerization and having a refractive index of at least 1.63 and an Abbe's number of at least 27.

2. The high-refractive index plastic optical material according to claim 1, wherein the purity of divinylbenzene is at least 70%.

3. The high-refractive index plastic optical material according to claim 1, wherein the proportion of the component A to the component B is 0.4-2.5 in terms of weight ratio.

* * * * *